(12) United States Patent
Lee et al.

(10) Patent No.: US 9,714,369 B2
(45) Date of Patent: Jul. 25, 2017

(54) PHYSICALLY CROSSLINKABLE ADHESIVE COPOLYMER

(71) Applicant: 3M INNOVATIVE PROPERTIES COMPANY, St. Paul, MN (US)

(72) Inventors: Hae-Seung Lee, Woodbury, MN (US); Stefan H. Gryska, Woodbury, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/117,485

(22) PCT Filed: Apr. 17, 2015

(86) PCT No.: PCT/US2015/026271
§ 371 (c)(1),
(2) Date: Aug. 9, 2016

(87) PCT Pub. No.: WO2015/167819
PCT Pub. Date: Nov. 5, 2015

(65) Prior Publication Data
US 2017/0037286 A1 Feb. 9, 2017

Related U.S. Application Data

(60) Provisional application No. 61/984,940, filed on Apr. 28, 2014.

(51) Int. Cl.
*C08F 220/58* (2006.01)
*C09J 151/00* (2006.01)
*C08F 265/06* (2006.01)
*C09J 7/02* (2006.01)

(52) U.S. Cl.
CPC ......... *C09J 151/003* (2013.01); *C08F 265/06* (2013.01); *C09J 7/0217* (2013.01); *C09J 2433/00* (2013.01); *C09J 2467/006* (2013.01)

(58) Field of Classification Search
CPC ... C08F 265/06; C08F 220/18; C09J 151/003; C09J 7/0217
See application file for complete search history.

(56) References Cited

U.S. PATENT DOCUMENTS

| | | | |
|---|---|---|---|
| 5,506,279 A | 4/1996 | Bennett | |
| 5,902,836 A | 5/1999 | Bennett | |
| 6,448,301 B1 | 9/2002 | Gaddam | |
| 6,664,306 B2 | 12/2003 | Gaddam | |
| 8,137,807 B2 | 3/2012 | Clapper | |
| 8,356,717 B2 | 1/2013 | Waller, Jr. | |
| 2002/0161058 A1* | 10/2002 | Green | C08F 2/10 516/98 |

FOREIGN PATENT DOCUMENTS

| | | |
|---|---|---|
| EP | 2500367 | 9/2012 |
| WO | WO 95/10552 | 4/1995 |
| WO | WO 2011-152967 | 12/2011 |
| WO | WO 2015-077114 | 5/2015 |
| WO | WO 2015-108765 | 7/2015 |

OTHER PUBLICATIONS

International Search report for PCT International Application No. PCT/US2015/026271 mailed on Jul. 27, 2015, 3 pages.

* cited by examiner

*Primary Examiner* — Mark Kaucher
(74) *Attorney, Agent, or Firm* — Kent S. Kokko

(57) ABSTRACT

A polymerizable composition comprising a (meth)acrylate copolymer having pendent photoinitiator groups and a high $T_g$ monomer or macromer is described. The resulting copolymer is physically crosslinking and is of the formula I: (I).

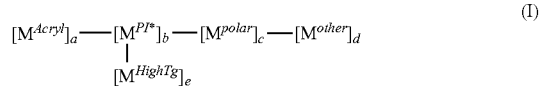

18 Claims, No Drawings

PHYSICALLY CROSSLINKABLE ADHESIVE COPOLYMER

CROSS REFERENCE TO RELATED APPLICATIONS

This application is a national stage filing under 35 U.S.C. 371 of PCT/US2015/026271, filed Apr. 17, 2015, which claims the benefit of U.S. Application No. 61/984,940, filed Apr. 28, 2014, the disclosure of which is incorporated by reference in its/their entirety herein.

BACKGROUND

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, adhesives are known to possess properties including the following: (1) adherence with no more than finger pressure, (2) sufficient ability to hold onto an adherend, and (3) sufficient cohesive strength to be removed cleanly from the adherend. Materials that have been found to function well as adhesives include polymers designed and formulated to exhibit the requisite viscoelastic properties resulting in a desired balance of tack, peel adhesion, and shear holding power.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize an adhesive.

SUMMARY

The present disclosure provides an adhesive copolymer comprising a (meth)acrylate copolymer, and grafted thereto a group having a high glass transition temperature side chain. The adhesive copolymer may be represented by the formula:

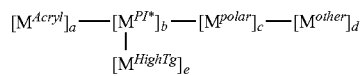

I wherein
$M^{acryl}$ represents (meth)acrylate ester monomer units and subscript a is at least one;
$M^{PI*}$ represents the residue of monomer units having pendent photoinitiator groups and subscript b is at least one;
$M^{polar}$ represents monomer units having polar functional groups and subscript c is zero or non-zero;
$M^{other}$ represents other monomer units and subscript d is zero or non-zero;
$M^{HighTg}$ represent a high $T_g$ group and subscript e is at least one.

In some embodiments, the $M^{HighTg}$ is a grafted side chain from the polymerization of high $T_g$ monomers. In other embodiments, the $M^{HighTg}$ is a grafted high $T_g$ (meth) acrylate macromer.

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz. In particular, the instant adhesive compositions have high cohesive strength in the absence of crosslinking agents.

In some embodiments, adhesive compositions are provided which applied to substrates from the melt. Such hot melt adhesive compositions are substantially solvent-free. Hot melt adhesives are versatile and widely used in industrial applications, such as bookbindings, cardboard boxes, plastic parts and wooden articles, among others. They are generally 100% solid adhesives with application temperatures which vary from about 150 to about 180° C.

The adhesive compositions of the present disclosure provide an improved pressure-sensitive and hot-melt adhesive composition which may be adhered to a variety of substrates, including low surface-energy (LSE) substrates, within a wide temperature range and provide good adhesive strength and holding characteristics. The adhesive compositions are easily handled, and are environmentally friendly due to the low volatile organic compound (VOC) content, such as solvents. The adhesive compositions of the present disclosure further provide a pressure-sensitive adhesive article, such as adhesive tapes and sealants.

DETAILED DESCRIPTION

The adhesive copolymer comprises interpolymerized monomer units of (meth)acrylic esters of a non-tertiary alcohol (acrylate esters), which alcohol contains from 1 to 18 carbon atoms and preferably an average of from 4 to 12 carbon atoms. A mixture of such monomers may be used. The acrylate ester monomer unit is represented as $M^{acryl}$.

Examples of monomers suitable for use as the (meth) acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable.

In some embodiments, the preferred (meth)acrylate ester monomer is the ester of (meth)acrylic acid with an alcohol derived from a renewable source, such as 2-octanol, citronellol, dihydrocitronellol.

In some embodiments a portion of the above described (meth)acrylate esters may be substituted with (meth)acrylates derived from 2-alkyl alkanols (Guerbet alcohols) as described in U.S. Pat. No. 8,137,807 (Lewandowski et al.), incorporated herein by reference.

The (meth)acrylate ester monomer is present in an amount of 70 to 99 parts by weight based on 100 parts total monomer content in the monomer mixture. Preferably (meth)acrylate ester monomer is present in an amount of 75 to 95 parts by weight, most preferably 80 to 95 parts by weight, based on 100 parts total monomer content. With reference to the copolymer of Formula I, subscript a is chosen such that the (meth)acrylate comprises these weight ranges. Subscript a therefore is non-zero, and may be a normalized, non-integral value.

The adhesive copolymer further comprises photoinitiator monomers, $[M^{PI}]$ include a (meth)acryloyl group and a photoinitiator group, which may be a hydrogen-abstracting type or an α-cleavage-type photoinitiator group, (Norrish Type I and II) and may be represented by the formula:

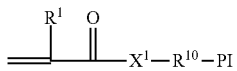
III where;

$X^1$ is —O— or —$NR^1$, $R^1$ is independently H or $C_1$-$C_4$ alkyl;

$R^{10}$ is a divalent (hetero)hydrocarbyl linking group connecting the (meth)acryloyl group with the PI group; and PI is a photoinitiator which may be represented by the structure:

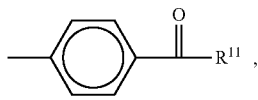

wherein $R^{11}$ is

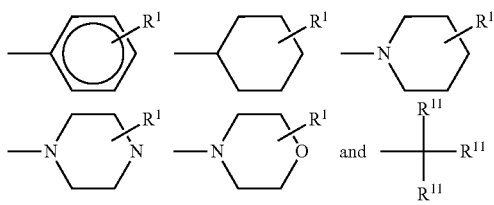

wherein $R^1$ is H or a $C_1$ to $C_4$ alkyl group, each $R^{11}$ is independently a hydroxyl group, a phenyl group, a $C_1$ to $C_6$ alkyl group, or a $C_1$ to $C_6$ alkoxy group. Such photoinitiator monomers are described, for example, in U.S. Pat. Nos. 5,902,836 (Babu et al.) and 5,506,279 (Babu et al.), the disclosures of which are herein incorporated by reference. Further details regarding the linking $R^{10}$ group may be found with reference to the cited references.

In certain embodiments, the photoinitiator group PI may be of the hydrogen-abstraction type represented by the general formula:

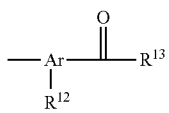

in which Ar is a substituted aryl having 6 to 12 carbon atoms, preferably a benzenetriyl group;

$R^{12}$ is hydrogen, a $C_1$ to $C_{12}$ alkyl group, a $C_1$ to $C_{12}$ alkoxy group, or a phenyl group; and $R^{13}$ is a $C_1$ to $C_6$ alkyl group, the $R^{13}$ optionally containing a hydroxy group, a cycloalkyl group having 3 to 14 carbon atoms, or

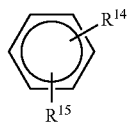

wherein $R^{14}$ and $R^{15}$ are independently selected from hydrogen, $C_1$ to $C_{12}$ alkyl groups, $C_1$ to $C_{12}$ alkoxy groups, and phenyl groups.

A variety of photoinitiator grafting monomers can be made by reaction of: 1) an acryloyl monomer comprising a first reactive functional group with 2) a compound that comprises a radiation-sensitive group (photoinitiator group) and second reactive functional group, the two functional groups being co-reactive with each other. Preferred co-reactive compounds are ethylenically unsaturated aliphatic, cycloaliphatic, and aromatic compounds having up to 36 carbon atoms, optionally one or more oxygen and/or nitrogen atoms, and at least one reactive functional group.

When the first and second functional groups react, they form a covalent bond and link the co-reactive compounds. Examples of useful reactive functional groups include hydroxyl, amino, oxazolinyl, oxazolonyl, acetyl, acetonyl, carboxyl, isocyanato, epoxy, aziridinyl, acyl halide, and cyclic anhydride groups. Where the first reactive functional group is an isocyanato functional group, the second, co-reactive functional group preferably comprises a amino, carboxyl, or hydroxyl group. Where first reactive functional group comprises a hydroxyl group, the second, co-reactive functional group preferably comprises a carboxyl, isocyanato, epoxy, anhydride, acyl halide, or oxazolinyl group. Where the first reactive functional group comprises a carboxyl group, the second co-reactive functional group preferably comprises a hydroxyl, amino, epoxy, vinyloxy, or oxazolinyl group.

Representative examples of acrylate compounds having a reactive functional group include hydroxyalkyl acrylates such as 2-hydroxyethyl acrylate and 2-(2-hydroxyethoxy) ethyl acrylate; aminoalkyl acrylates such as 3-aminopropyl acrylate; oxazolonyl compounds such as 2-ethenyl-1,3-oxazolin-5-one and 2-propenyl-4,4-dimethyl-1,3-oxazolin-5-one; carboxy-substituted compounds such as acrylic acid and 4-carboxybenzyl acrylate; isocyanato-substituted compounds such as isocyanatoethyl acrylate and 4-isocyanato-cyclohexyl acrylate; epoxy-substituted compounds such as glycidyl acrylate; aziridinyl-substituted compounds such as N-acryloylaziridine; and acryloyl halides.

Representative examples of co-reactive compounds include functional group-substituted compounds such as 1-(4-hydroxyphenyl)-2,2-dimethoxyethanone, 1-[4-(2-hydroxyethyl)phenyl]-2,2-dimethoxyethanone, (4-isocyanatophenyl)-2,2-dimethoxy-2-phenylethanone, 1-{4-[2-(2,3-epoxypropoxy)phenyl]}-2,2-dimethyl-2-hydroxyethanone, 1-[4-(2-aminoethoxy)phenyl]-2,2-dimethoxyethanone, and 1-[4-(carbomethoxy)phenyl]-2,2-dimethoxyethanone.

A preferred photoinitiator monomer is to 2-propenoylaminoethanoic acid, 2-(4-(2-hydroxy-2 methylpropanoyl)phenoxy)ethyl ester, "VAZPIA" prepared according to Example 1 of U.S. Pat. No. 5,506,279 (Babu et al.).

Because hydrogen-abstraction type photoinitiators may lead to crosslinking rather than grafting, it is preferred that the photoinitiator monomers be of the alpha-cleavage type.

The photoinitiator monomers are used in amounts of 0.5 to 10, preferably 1 to 5 parts by weight, relative to 100 parts by weight total monomer. Such photoinitiator monomers are used as initiators to free radically polymerize the pendent high $T_g$ [$M^{HighTg}$] monomers. With reference to the copolymer of Formula II, subscript b is chosen such that the (meth)acrylate comprises these weight ranges. Subscript b therefore is non-zero, and may be a normalized, non-integral value.

The intermediate copolymer of Formula II may be provided with the requisite photoinitiator monomer units by directly grafting the photoinitiator monomers of Formula III. In an alternate embodiment, the photoinitiator monomer units by an indirect method whereby the copolymer is provided with monomer units having a reactive functional group and the resulting copolymer is subsequently functionalized with a photoinitiator group by means of a co-reactive functional group. For example, the copolymer may be prepared using an isocyanato-substituted monomer such as isocyanatoethyl acrylate to provide a copolymer having pendent isocyanate groups. This copolymer may then be functionalized with a photoiniator having a co-reaction functional group, such as 1-[4-(2-hydroxyethoxy)-phenyl]-2-hydroxy-2-methyl-1-propane-1-one (Irgacure™ 2959).

Alternatively, the same Irgacure™ 2959, may be reacted with 2-thiopropionic acid to produce a thiol-functional photoiniator, which may be reacted with a copolymer having electrophilic functional groups.

It may be noted that the grafted adhesive copolymer of Formula I contains the residue of the photoinitiator monomer, rather than the photoinitiator monomer per se. In the preparation of the copolymer, the incorporation of the photoiniator monomer provides a copolymer having pendent photoinitiator groups, represented by the formula:

$$[M^{Acryl}]_a\text{-}[M^{PI}]_b\text{-}[M^{polar}]_c\text{-}[M^{other}]_d, \quad\quad \text{II}$$

wherein
$M^{acryl}$ represents (meth)acrylate ester monomer units and subscript a is at least one;
$M^{PI}$ represents monomer units having pendent photoinitiator groups and subscript b is at least one;
$M^{polar}$ represents monomer units having polar functional groups and subscript c is zero or non-zero;
$M^{other}$ represents other monomer units and subscript d is zero or non-zero;

On irradiation of the copolymer of Formula II, in the presence of the high $T_g$ monomers or macromers, the photoinitiator groups photolyzes to produce a radical and the requisite high $T_g$ side chain is grafted to the copolymer chain to provide the adhesive copolymer of Formula I, as further described herein. It is preferred that the reaction of the copolymer of Formula I to produce the copolymer of Formula I occur in solvent to minimize any crosslinking between copolymer chains. Normally a chain transfer agent is not used.

High Tg

The adhesive copolymer further comprises grafted monomer units of high $T_g$ monomers or macromers. As used herein the term "high $T_g$ monomer" refers to a monomer, which when homopolymerized, produce a (meth)acrylate copolymer having a $T_g$ of ≥50° C. as estimated by the Fox equation. The incorporation of the high $T_g$ monomer to copolymer is sufficient to provide glassy segments to the copolymer. The high $T_g$ group is represented in the copolymer of Formula I as $M^{HighTg}$.

Suitable high $T_g$ monomers include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

In other embodiments, the $M^{HighTg}$ group is derived from free radical addition of a high $T_g$ macromer or macromonomer.

The high $T_g$ macromers are polymeric materials having a polymerizable group and may be represented by the general formula X—(Y)$_n$—Z wherein
X is a polymerizable vinyl or acrylate group;
Y is a divalent linking group where n can be zero or one; and
Z is a monovalent polymeric moiety having a $T_g \geq$ than 30° C. and a weight average molecular weight in the range of about 500 to 30,000 and being essentially unreactive under copolymerization conditions. Z is preferably selected from oligomeric styrene, methystyrene, poly(methyl methacrylate) and macromers of high $T_g$ monomers.

Preferred macromers are acrylate or methacrylate oligomers derived from high $T_g$ acrylate or methacrylate esters.

The high $T_g$ monomers or macromers are used in amounts of at least 1 part by weight, preferably at least 5 parts by weight, relative to 100 parts by weight to the photoinitiator-functional copolymer. With reference to the copolymer of Formula I, subscript e is chosen such that the (meth)acrylate comprises these weight ranges. Subscript e therefore is at least one, and may be a normalized, non-integral value.

The copolymer may further comprise a polar monomer designated $M^{polar}$ in Formula I. The polar monomers useful in preparing the copolymer are both somewhat oil soluble and water soluble, resulting in a distribution of the polar monomer between the aqueous and oil phases in an emulsion polymerization. As used herein the term "polar monomers" are inclusive of acid functional monomers.

Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone.

The polar monomer of the copolymer may comprise an acid functional monomer, where the acid functional group may be an acid per se, such as a carboxylic acid, or a portion may be a salt thereof, such as an alkali metal carboxylate. With regard to Formula I, $M^{polar}$ may be designated as $M^{acid}$ when acid functional monomers are used Useful acid functional monomers include, but are not limited to, those selected from ethylenically unsaturated carboxylic acids, ethylenically unsaturated sulfonic acids, ethylenically unsaturated phosphonic or phosphoric acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methyl-propanesulfonic acid, vinylphosphonic acid, and mixtures thereof.

Due to their availability, acid functional monomers of the acid functional copolymer are generally selected from ethylenically unsaturated carboxylic acids, i.e.

(meth)acrylic acids. When even stronger acids are desired, acidic monomers include the ethylenically unsaturated sulfonic acids and ethylenically unsaturated phosphonic acids.

The polar monomer may be present in amounts of 0 to 10 parts by weight, preferably 0.5 to 5 parts by weight, based on 100 parts by weight total monomer. With reference to the copolymer of Formula I, subscript c reflects these amounts, so c may be zero or non-zero, or a normalized, non-integral value.

The copolymer may further comprise a vinyl monomer, designated as $M^{other}$ in Formula I. When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers.

Such vinyl monomers are generally used at 0 to 5 parts by weight, preferably 1 to 5 parts by weight, based on 100 parts by weight total monomer. With reference to the copolymer of Formula I, subscript d reflects these amounts, so c may be zero or non-zero, or a normalized, non-integral value.

Generally, the intermediate copolymer of Formula II is prepared by thermal free-radical polymerization, combined with the high $T_g$ monomer or macromer, and irradiated, whereby the pendent photoinitiator groups photolyze and initiate free radical addition/polymerization of the high $T_g$ monomer/macromer.

The intermediate copolymer of Formula II can be prepared by techniques including, but not limited to, the conventional techniques of solvent polymerization, dispersion polymerization, and solventless bulk polymerization. The monomer mixture further comprises a thermal polymerization initiator, as photopolymerization will photolyse the pendent photoinitiator groups of the copolymer.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

Water-soluble and oil-soluble initiators useful in preparing the hydrophobic polymer stabilizer used in the present invention are initiators that, on exposure to heat, generate free-radicals which initiate (co)polymerization of the monomer mixture. Water-soluble initiators are preferred for preparing the (meth)acrylate polymers by emulsion polymerization. Suitable water-soluble initiators include but are not limited to those selected from the group consisting of potassium persulfate, ammonium persulfate, sodium persulfate, and mixtures thereof oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate.

Suitable oil-soluble initiators include but are not limited to those selected from the group consisting of azo compounds such as VAZO™ 64 (2,2'-azobis(isobutyronitrile)) and VAZO™ 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)). When used, initiators may comprise from about 0.05 to about 1 part by weight, preferably about 0.1 to about 0.5 part by weight based on 100 parts by weight of monomer components in the pressure-sensitive adhesive.

If desired, the molecular weight, Mw, of the copolymer of Formula II may be controlled with the use of chain transfer agents. Chain transfer agents which may be used are mercapto compounds such as dodecylmercaptan and halogen compounds such as carbon tetrabromide. Chain transfer agents are generally not used during the subsequent graft polymerization of the high $T_g$ monomers.

Once the copolymer of Formula II is prepared, it is combined with the high $T_g$ monomer or macromer and irradiated. The polymerizable composition may be irradiated with activating UV radiation to photolyse the pendent photoinitiator group and polymerize the high $T_g$ monomer or macromer component(s) to produce the adhesive copolymer of Formula I. The degree of conversion (of monomers or macromers to grafted copolymer) can be monitored during the irradiation by measuring the index of refraction of the polymerizing mixture.

UV light sources can be of two types: 1) relatively low light intensity sources such as backlights which provide generally 10 mW/cm² or less (as measured in accordance with procedures approved by the United States National Institute of Standards and Technology as, for example, with a Uvimap™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm², preferably between 15 and 450 mW/cm². For example, an intensity of 600 mW/cm² and an exposure time of about 1 second may be used successfully. Intensities can range from about 0.1 to about 150 mW/cm², preferably from about 0.5 to about 100 mW/cm², and more preferably from about 0.5 to about 50 mW/cm². Such photoinitiators preferably are present in an amount of from 0.1 to 1.0 pbw per 100 pbw of the polymer composition.

As previously described, a copolymer intermediate of Formula II is prepared, combined with the high $T_g$ monomer or macromer, then irradiated. The pendent photoinitiator groups of the copolymer photolyse generating a free radical, which will initiate free radical addition/polymerization of the high $T_g$ monomer/macromer. The pendent high $T_g$ group or side chain is connected to the main polymer chain by the residue of the photoinitiator groups.

For example a grafting photoinitator monomer such as 2-propenoylaminoethanoic acid; 2-(4-(2-hydroxy-2 methyl-propanoyl)phenoxy)ethyl ester may be grafted to a substrate surface using ionizing radiation such as e-beam energy. In the presence of UV, the photoinitiator undergoes alpha cleavage to two radicals. In the presence of the high $T_g$ monomer or macromers, the radical adds to the ethylenically unsaturated group (such as the depicted acryloyl group) to indirectly graft the ligand monomer to the substrate surface via the residue of the photoinitator as shown in Scheme 1 below.

In the Scheme the copolymer of Formula II contains a grafting photoinitator monomer [$M^{PI}$] such as 2-propenoylaminoethanoic acid; 2-(4-(2-hydroxy-2 methylpropanoyl)phenoxy)ethyl ester. When irradiated, such as in the presence of UV, the photoinitiator undergoes alpha cleavage to two radicals. In the presence of the high $T_g$ monomer or macromers, the radical adds to the monomer/macromer to directly graft the monomer/macromer to the copolymer chain via the residue of the photoinitiator as shown in Scheme I below. The "residue" of the photoinitiator monomer is shown as $M^{PI*}$ in Formula I and is that portion of the MPI monomer remaining after photolysis, and which initiates polymerization. It will be further understood that the radical addition product of the high $T_g$ monomer may further copolymerize with additional high $T_g$ monomers to produce a grafted copolymer of Formula I.

Scheme I

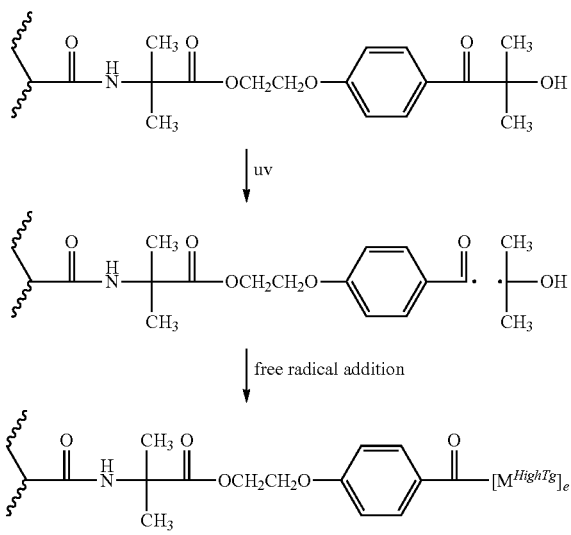

As result of the high $T_g$ grafted side chains, the copolymer physically crosslinks. It is believed that the grafted high $T_g$ groups phase separate from the main polymer chain.

This phase separation results in the formation of separate domains of the grafted polymer that function as physical crosslinks for the (meth)acrylate copolymer chain. The grafted copolymer can be used as an adhesive such as a pressure sensitive adhesive. The cohesive strength of the adhesive tends to increase with the introduction of more grafted groups.

Generally 0.01 to 10 percent, preferably 0.1 to 5 percent, of the monomer units of the copolymer of Formula II is substituted by grafted high $T_g$ groups, corresponding to the amount of copolymerized photoinitiator monomers. Put differently, the weight percent of the grafted high $T_g$ groups in the grafted polymer is generally 5-30 wt. %.

Physical crosslinking typically relies on the natural or induced formation of entanglements within the grafted polymeric chains and tends to increase the cohesive strength of adhesive compositions such as pressure-sensitive adhesive compositions. Physical crosslinking is often desired because the pressure-sensitive adhesive can be processed in a melted state at relatively high temperatures yet can take on a crosslinked form at lower temperatures. That is, the pressure-sensitive adhesives can be used as hot melt adhesives. In contrast, chemical crosslinked pressure-sensitive adhesives typically cannot be processed as hot melt adhesives. Hot melt processing is often considered desirable because the use of inert organic solvents can be minimized or eliminated. The minimization or elimination of inert organic solvents can be desirable from both an environmental and economic perspective.

Physical crosslinking is enhanced when the grafted high $T_g$ group has a glass transition temperature greater than or equal to at least 30° C. To form such a grafted side chain, the monomers used are selected to have a glass transition temperature equal to at least 30° C. (when polymerized as a homopolymer and as estimated by the Fox equation).

In addition to the glass transition temperature, the molecular weight of the high $T_g$ grafted group can affect whether or not the grafted copolymer of Formula I will phase separate and physically crosslink. Phase separation and entanglement is more likely if number of repeat units of a given grafted group is at least 10. It will be appreciated that the photoinitiated polymerization is essentially uncontrolled, and a range of repeat units (subscript e of Formula I) will be present. However, the copolymer of Formula II is prepared with s sufficient number of photoinitiator monomer units, and then grafted with a sufficient amount of high $T_g$ monomers or macromers, such that the high $T_g$ groups will phase separate to effect physical crosslinking Generally, at least 10% of the grafted high $T_g$ groups have at least ten repeat units; at least ten percent of subscript e is ten or more, and is less than 50.

If higher molecular weight of the grafted high $T_g$ groups becomes too large (i.e. the number of repeat units e is too large), the number of grafted polymer groups formed on a weight basis by reaction with the main polymer chain may be diminished. That is, as the molecular weight of the grafted high $T_g$ groups increases, it can become more difficult to achieve a high degree of substitution of grafted high $T_g$ groups on a weight basis.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 10 to 250 microns, are contemplated.

The substrate is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

The adhesive can also be provided in the form of an adhesive transfer tape in which at least one layer of the adhesive is disposed on a release liner for application to a permanent substrate at a later time. The adhesive can also be provided as a single coated or double coated tape in which the adhesive is disposed on a permanent backing.

EXAMPLES

TABLE 1

Materials

| Designation | Description and Source |
|---|---|
| AA | Acrylic acid, available from Sigma Aldrich, St. Louis, MO |
| EtOAc | Ethyl acetate, available from Sigma Aldrich, St. Louis, MO |
| HOSTAPHAN 3SAB | Primed polyester film available from Mitsubishi, Greer, SC, under the trade designation "HOSTAPHAN 3SAB" |
| IBoA | Isobornyl acrylate, available from Sigma Aldrich, St. Louis, MO |
| IOA | Isooctylacrylate (CAS Number: 29590-42-9), available from 3M Co., St. Paul, MN |
| VAZO 67 | 2,2'-azobis-(2-methylbutyronitrile) (CAS Number: 13472-08-7), available from DuPont, Wilmington, DE, under the trade designation "VAZO 67" |
| VAZPIA | 2-[4-(2-hydroxy-2-methylpropanoyl)phenoxy]ethyl-2-methyl-2-N-propenoylamino propanoate (disclosed in U.S. Pat. No. 5,506,279), available from 3M Co., St. Paul, MN, under the trade designation "VAZPIA" |

Test Methods

90° Angle Peel Adhesion Strength Test

Peel adhesion strength was measured at a 90° angle using an IMASS SP-200 SLIP/PEEL TESTER (available from IMASS, Inc., Accord Mass.) at a peel rate of 305 mm/minute (12 inches/minute) using the procedure described in ASTM International standard, D3330, Method F. Test panels of either stainless steel or soda-lime glass were prepared by wiping the panels with a tissue wetted with the corresponding solvents shown in Table 2 using heavy hand pressure to wipe the panel 8-10 times. The test panels were wiped two more times with clean tissues wetted with the solvent. The cleaned panel was allowed to dry. The adhesive tape was cut into strips measuring 1.27 cm×20 cm (½ in.×8 in.) and the strips were rolled down onto the cleaned panel with a 2.0 kg (4.5 lb.) rubber roller using 2 passes. The prepared samples were stored at 23° C./50% RH for 24 hours before testing. Two samples were tested for each example and averaged values were expressed in Oz/inch. Failure mode was noted and recorded as: cohesive ("COH", i.e., the adhesive split leaving residue on both the tape and test surface); adhesive ("ADH", i.e., the adhesive peeled cleanly from the test surface); or 2-B 2-Bond ("2-B", i.e., the adhesive peeled away from the backing).

TABLE 2

Peel Adhesion Test Panel Materials

| Material | Solvent |
|---|---|
| SS - Stainless Steel | Heptane |
| Glass - Soda-lime glass | Heptane |

Static Shear Strength Test

Static shear strength was evaluated as described in the ASTM International standard, D3654, Procedure A-at 23° C./50% RH (relative humidity) using a 500 g load. Tape test samples measuring 1.27 cm×15.24 cm (½ in.×6 in.) were adhered to 1.5 inch by 2 inch stainless steel (SS) panels using the method to clean the panel and adhere the tape described in the peel adhesion test. The tape overlapped the panel by 1.27 cm×2.5 cm. and the strip was folded over itself on the adhesive side, and then folded again. A hook was hung in the second fold and secured by stapling the tape above the hook. The weight was attached to the hook and the panels were hung in a 23° C./50% RH room. The time to failure in minutes was recorded. If no failure was observed after 10,000 minutes, the test was stopped and a value of >10,000 minutes was recorded. The mode of failure described in the peel adhesion test was also noted.

Percent Gel Test

The percent gel content of samples was determined as described in the ASTM International standard, D3616-95. A round test specimen measuring $^{63}/_{64}$ inch (25 mm) in diameter was die-cut from a tape coated with the polymer and cured. The specimen was placed in a mesh basket measuring 1½ inch (3.8 cm) by 1½ inch (3.8 cm). The basket with the specimen was weighed to the nearest 0.1 mg and placed in a capped jar containing sufficient toluene to cover the sample. After 24 hours the basket (containing the specimen) was removed, drained and placed in an oven at 120° C. for 30 minutes. The percent gel was determined by calculating weight % ("wt. %") of the remaining, unextracted portion to the original sample. A disc of the uncoated polyester backing material of the same size as the specimen was also die-cut and weighed. The weight percent gel ("wt. % gel") was calculated according to the equation:

$$\text{wt. \% gel} = 100 \times \frac{(\text{unextracted sample wt. after extraction} - \text{uncoated backing wt.})}{(\text{original sample wt.} - \text{uncoated backing wt.})}$$

Molecular Weight Determination by Gel Permeation Chromatography (GPC)

Molecular weight and polydispersity (MW/MN) of polymer samples were characterized by using gel permeation chromatography (GPC, Manufacturer: Waters Corporation (Milford, Mass.)). The instrument consists of a pump (model#: 1515), an auto sampler (model#:2707), a UV detector (model#: 2489), and a refractive index detector (model#: 2414). Polymer sample solutions were prepared by dissolving dry polymers in tetrahydrofuran (THF) at 1.0 weight percent and were filtered with 0.2 micron Teflon syringe filters. The molecular weight calculations were based upon a calibration made of narrow dispersity polystyrene (PS) molecular weight standards.

Preparation of Base PSA Polymer Solution

PSA copolymers were prepared by radical polymerization with three monomers IOA, AA, and VAZPIA. The monomers were mixed with a reaction solvent (EtOAc) with a concentration of 30% (solid %) and thermal radical initiator (VAZO 67, 0.3 wt. % of total solids) in an amber, narrow necked pint bottles at room temperature. The solutions were de-aerated by purging with nitrogen gas for 10 minutes at room temperature. The bottles were capped tightly and put in an Atlas launderometer at 60° C. for 24-48 hours. The bottles were then cooled to room temperature and the polymer solutions were used for further evaluations. Detailed monomer compositions were as summarized in Table 3.

TABLE 3

| Base PSA Polymer Solution | IOA, wt. % | AA, wt. % | IOA/AA Weight Ratio | VAZPIA (wt. %) | Wt. % Solids in EtOAc |
|---|---|---|---|---|---|
| A | 90 | 10 | 90/10 | 0 | 30 |
| B | 89.1 | 9.9 | 90/10 | 1 | 30 |

TABLE 3-continued

| Base PSA Polymer Solution | IOA, wt. % | AA, wt. % | IOA/AA Weight Ratio | VAZPIA (wt. %) | Wt. % Solids in EtOAc |
|---|---|---|---|---|---|
| C | 87.75 | 9.75 | 90/10 | 2.5 | 30 |
| D | 85.5 | 9.5 | 90/10 | 5 | 30 |

Examples 1-11

Base PSA polymer solutions (A, B, C, and D), as prepared in the previous section, were used for preparing PSA coating solutions. Example 1, 3, 5, 7 solutions were made with the base PSA polymer solutions A, B, C, D, respectively, without any further treatments. Example 2, 4, 6, 8 were also made with base PSA polymer A, B, C, D, respectively but they were mixed with 20 pph of isobornyl acrylate added to the base PSA polymer solution and UV irradiated for 20 min. Example 9, 10, 11 were made with polymer C (VAZPIA, 2.5 wt. %) and 20 pph isobornyl acrylate, but the UV irradiation time for each sample was different, with irradiation times of 5, 10 and 60 minutes for Example 9, 10, and 11, respectively. Detailed composition and UV irradiation times were as summarized in Table 4.

TABLE 4

| Example | Base polymer | Isobornyl Acrylate, pph | UV irradiation, minutes | Solution Visual Appearance | Final solution wt. % solid |
|---|---|---|---|---|---|
| Ex. 1 | A | 0 | 0 | Transparent | 30 |
| Ex. 2 | A | 20 | 20 | Transparent | 34 |
| Ex. 3 | B | 0 | 0 | Transparent | 30 |
| Ex. 4 | B | 20 | 20 | Slightly hazy | 34 |
| Ex. 5 | C | 0 | 0 | Transparent | 30 |
| Ex. 6 | C | 20 | 20 | Slightly hazy | 34 |
| Ex. 7 | D | 0 | 0 | Transparent | 30 |
| Ex. 8 | D | 20 | 20 | Slightly hazy | 34 |
| Ex. 9 | C | 20 | 5 | Slightly hazy | 34 |
| Ex. 10 | C | 20 | 10 | Slightly hazy | 34 |
| Ex. 11 | C | 20 | 60 | Transparent | 34 |

For each of the prepared compositions of Ex. 1 to Ex. 11, the prepared composition was knife-coated onto a 6 inch (15 cm) by 25 inch (64 cm) strip of polyester film backing (HOSTAPHAN 3SAB) to a wet thickness of about 15 mils (380 micrometers). The coated film was dried in an oven set at 70° C. for 60 minutes to provide a tape having an adhesive coating thickness of 2 mils (51 micrometers), to provide corresponding tapes Examples 12-22.

All tapes (Examples 12-22) were conditioned at 23° C., 50% RH for 24 hours before testing for shear strength and 90° peel adhesion. Shear test results and adhesion data are shown in Tables 5 and 6, respectively.

TABLE 5

| Example | Coating solution | Room temp shear (min) | Failure Mode* |
|---|---|---|---|
| Ex. 12 | Ex. 1 | 341 | COH |
| Ex. 13 | Ex. 2 | 354 | COH |
| Ex. 14 | Ex. 3 | 136 | COH |
| Ex. 15 | Ex. 4 | 1141 | COH |
| Ex. 16 | Ex. 5 | 235 | COH |
| Ex. 17 | Ex. 6 | 2205 | COH |
| Ex. 18 | Ex. 7 | 340 | COH |
| Ex. 19 | Ex. 8 | >10000 | None |

TABLE 5-continued

| Example | Coating solution | Room temp shear (min) | Failure Mode* |
|---|---|---|---|
| Ex. 20 | Ex. 9 | 641 | COH |
| Ex. 21 | Ex. 10 | 2158 | COH |
| Ex. 22 | Ex. 11 | >10000 | None |

*COH = "cohesive"

TABLE 6

| Example | Coating solution | Stainless steel adhesion (N/dm) | Glass adhesion (N/dm) | Failure Mode* |
|---|---|---|---|---|
| 23 | Ex. 1 | 31.1 | 44.4 | ADH |
| 24 | Ex. 2 | 27.5 | 44.1 | ADH |
| 25 | Ex. 3 | 26.6 | 44.9 | ADH |
| 26 | Ex. 4 | 18.2 | 35.7 | ADH |
| 27 | Ex. 5 | 41.6 | 39.8 | ADH |
| 28 | Ex. 6 | 41.5 | 40.9 | ADH |
| 29 | Ex. 7 | 27.3 | 42.5 | ADH |
| 30 | Ex. 8 | 16.1 | 40.9 | ADH |
| 31 | Ex. 9 | 33.5 | 39.0 | ADH |
| 32 | Ex. 10 | 25.1 | 38.5 | ADH |
| 33 | Ex. 11 | 40.3 | 47.3 | ADH |

*ADH = "adhesive"

TABLE 7

| Example | Coating solution | Mn by GPC, Kg/mol | Mw by GPC, Kg/mol | Polydispersity | Wt. % gel |
|---|---|---|---|---|---|
| 34 | Ex. 1 | 167 | 397 | 2.4 | <1 |
| 35 | Ex. 2 | 197 | 447 | 2.3 | <1 |
| 36 | Ex. 3 | 41 | 153 | 3.8 | <1 |
| 37 | Ex. 4 | 58 | 285 | 4.9 | <1 |
| 38 | Ex. 5 | 48 | 154 | 3.2 | <1 |
| 39 | Ex. 6 | 76 | 491 | 4.3 | <1 |
| 40 | Ex. 7 | 48 | 157 | 3.3 | <1 |
| 41 | Ex. 8 | 59 | 261 | 4.4 | <1 |
| 42 | Ex. 9 | 73 | 323 | 4.4 | <1 |
| 43 | Ex. 10 | 75 | 416 | 5.4 | <1 |
| 44 | Ex. 11 | 76 | 524 | 6.9 | <1 |

This disclosure provides the following embodiments:
1. An adhesive copolymer of the formula:

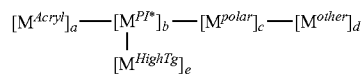

wherein
$M^{acryl}$ represents (meth)acrylate ester monomer units and subscript a is non-zero;
$M^{PI*}$ represents the residue of monomer units having pendent photoinitiator groups and subscript b is non-zero;
$M^{polar}$ represents monomer units having polar functional groups and subscript c is zero or non-zero;
$M^{other}$ represents other monomer units and subscript d is zero or non-zero;
$M^{HighTg}$ represent a high $T_g$ group and subscript e is at least one.
2. The adhesive copolymer of embodiment 1 wherein said copolymer comprises:
(a) from 70 to 99 parts by weight of polymerized monomer units acrylic ester monomers;
(b) from 0.5 to 10 parts by weight of polymerized monomer units derived from of an monomer having a photoinitiator group;

(c) from 0 to 10 parts by weight of polymerized polar monomer units;
(d) from 0 to 10 parts by weight of polymerized monomer units derived from at least one other monomer; and
(e) from 1 to 5 parts by weight of grafted high $T_g$ monomer units;
the sum of monomer units being 100 parts by weight.

3. The adhesive copolymer of any of the previous embodiments wherein said copolymer comprises 1 to 5 parts by weight of acid-functional monomer units.

4. The adhesive copolymer of any of the previous embodiments, wherein subscript e is 2 to 10 times that of subscript b.

5. The adhesive copolymer of any of embodiments 2-4 comprising 90 to 95 parts by weight of acrylate ester monomers.

6. The adhesive copolymer of any of the previous embodiments wherein the high $T_g$ group $M^{HighTg}$ is derived from polymerized high $T_g$ monomers.

7. The adhesive copolymer of any of the previous embodiments wherein $M^{HighTg}$ is a high $T_g$ macromer.

8. The adhesive copolymer of embodiment 7 wherein the high $T_g$ macromer is a styrene macromer, a poly(methyl methacrylate) macromer or a macromer derived from a high $T_g$ monomer.

9. The adhesive copolymer of any of the previous embodiments wherein $M^{PI*}$ is derived from monomers of the formula

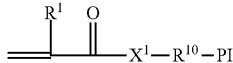

where;
$X^1$ is —O— or
$R^1$ is independently H or $C_1$-$C_4$ alkyl;
PI is a photoinitiator group;
$R^{10}$ is a divalent (hetero)hydrocarbyl linking group connecting the (meth)acryloyl group with the PI group.

10. The adhesive copolymer of embodiment 9 wherein the PI group is an alpha-cleavage type photoinitiator group.

11. The adhesive copolymer of any of embodiments 2-10, wherein the copolymer comprises from 0.5 to 10 parts by weight of polymerized monomer units, $M^{PI*}$, derived from of an monomer having a photoinitiator group.

12. The adhesive copolymer of any of embodiments 1-11 wherein the high $T_g$ monomer is selected from t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

13. The adhesive copolymer of any of the previous embodiments wherein 0.01 to 10 percent of the monomer units are substituted by grafted high $T_g$ groups.

14. The adhesive copolymer of any of the previous embodiments wherein the weight percent of the grafted high $T_g$ groups in the grafted copolymer is 5-30 wt. %.

15. The adhesive copolymer of any of the previous embodiments, wherein at least 10% of the $M^{HighTg}$ monomer units have a subscript e of at least 10.

16. A polymerizable composition comprising a (meth)acrylate copolymer having pendent photoinitiator groups and a high $T_g$ monomer or macromer.

17. The polymerizable composition of embodiment 16 wherein the (meth)acrylate copolymer having pendent photoinitiator groups is of the formula:

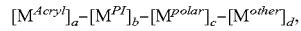

wherein
$M^{Acryl}$ represents (meth)acrylate ester monomer units and subscript a is at least one;
$M^{PI}$ represents monomer units having pendent photoinitiator groups and subscript b is at least one;
$M^{polar}$ represents monomer units having polar functional groups and subscript c is zero or non-zero;
$M^{other}$ represents other monomer units and subscript d is zero or non-zero.

18. The polymerizable composition of any of embodiments 16-17 wherein the high $T_g$ macromer is of the formula:

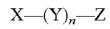

wherein
X is a polymerizable vinyl or acrylate group;
Y is a divalent linking group where n can be zero or one; and
Z is a monovalent polymeric moiety having a $T_g \geq$ than 30° C.

19. The polymerizable composition of any of embodiments 16-18 wherein the high $T_g$ macromer is selected from oligomeric styrene, methystyrene, poly(methyl methacrylate) and macromers of high $T_g$ monomers.

20. The polymerizable composition of any of embodiments 16-19 comprising 70-95 wt. % of said (meth)acrylate copolymer having pendent photoinitiator groups and 5-30 wt. % of a high $T_g$ monomers.

21. The polymerizable composition of any of embodiments 16-20 wherein MPI comprises interpolymerized monomers of the formula:

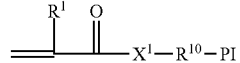

where;
$X^1$ is —O— or
$R^1$ is independently H or $C_1$-$C_4$ alkyl;
PI is a photoinitiator group;
$R^{10}$ is a divalent (hetero)hydrocarbyl linking group connecting the (meth)acryloyl group with the PI group.

22. The polymerizable composition of embodiment 21 wherein the photoinitiator groups of the photoinitiator monomer $M^{PI}$ is an alpha-cleavage type photoinitiator group.

What is claimed is:
1. An adhesive copolymer of the formula:

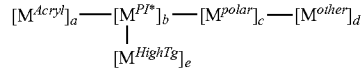

wherein
$M^{Acryl}$ represents acrylate ester monomer units and subscript a is non-zero;

$M^{PI*}$ represents the residue of monomer units having pendent photoinitiator groups and subscript b is non-zero;

$M^{polar}$ represents monomer units having polar functional groups and subscript c is zero or non-zero;

$M^{other}$ represents other monomer units and subscript d is zero or non-zero;

$M^{HighTg}$ represent a high $T_g$ group and subscript e is at least one, wherein said copolymer comprises:
(a) from 70 to 99 parts by weight of polymerized monomer units acrylic ester monomers;
(b) from 0.5 to 10 parts by weight of polymerized monomer units derived from of an monomer having a photoinitiator group;
(c) from 0 to 10 parts by weight of polymerized polar monomer units;
(d) from 0 to 10 parts by weight of polymerized monomer units derived from at least one other monomer; and
(e) from 1 to 5 parts by weight of grafted high $T_g$ monomer units, which are monomers that when homopolymerized produce a polymer having a Tg of $\geq 50°$ C.;
the sum of monomer units being 100 parts by weight.

2. The adhesive copolymer of claim 1 wherein said copolymer comprises 1 to 5 parts by weight of acid-functional monomer units.

3. An adhesive copolymer of the formula:

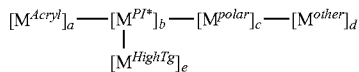

wherein
$M^{acryl}$ represents (meth)acrylate ester monomer units and subscript a is non-zero;
$M^{PI*}$ represents the residue of monomer units having pendent photoinitiator groups and subscript b is non-zero;
$M^{polar}$ represents monomer units having polar functional groups and subscript c is zero or non-zero;
$M^{other}$ represents other monomer units and subscript d is zero or non-zero;
$M^{HighTg}$ represent a high $T_g$ group having a Tg of $\geq 50°$ C. and subscript e is at least one, and
wherein subscript e is 2 to 10 times that of subscript b.

4. The adhesive copolymer of claim 1 comprising 90 to 95 parts by weight of acrylate ester monomers.

5. The adhesive copolymer of claim 1 wherein the high $T_g$ group $M^{HighTg}$ is derived from polymerized high $T_g$ monomers.

6. The adhesive copolymer of claim 1 wherein $M^{HighTg}$ is a high $T_g$ macromer.

7. The adhesive copolymer of claim 6 wherein the high $T_g$ macromer is a styrene macromer, a poly(methyl methacrylate) macromer or a macromer derived from a high $T_g$ monomer.

8. The adhesive copolymer of claim 1 wherein $M^{PI*}$ is derived from monomers of the formula

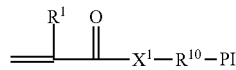

where;
$X^1$ is —O— or —NR$^1$,
$R^1$ is independently H or $C_1$-$C_4$ alkyl;
PI is a photoinitiator group;
$R^{10}$ is a divalent (hetero)hydrocarbyl linking group connecting the (meth)acryloyl group with the PI group.

9. The adhesive copolymer of claim 8 wherein the PI group is an alpha-cleavage type photoinitiator group.

10. The adhesive copolymer of claim 1, wherein the copolymer comprises from 0.5 to 10 parts by weight of polymerized monomer units, $M^{PI*}$, derived from of a monomer having a photoinitiator group.

11. The adhesive copolymer of claim 5 wherein the high $T_g$ monomer is selected from t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

12. The adhesive copolymer of claim 1, wherein at least 10% of the $M^{highTg}$ monomer units have a subscript e of at least 10.

13. A polymerizable composition comprising a (meth)acrylate copolymer having pendent photoinitiator groups and a high $T_g$ macromer of the formula:

X—(Y)$_n$—Z wherein
X is a polymerizable vinyl or acrylate group;
Y is a divalent linking group where n can be zero or one; and
Z is a monovalent polymeric moiety having a $T_g \geq$ than 30° C.

14. The polymerizable composition of claim 13 wherein the (meth)acrylate copolymer having pendent photoinitiator groups is of the formula:

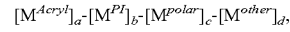

wherein
$M^{acryl}$ represents (meth)acrylate ester monomer units and subscript a is at least one;
$M^{PI}$ represents monomer units having pendent photoinitiator groups and subscript b is at least one;
$M^{polar}$ represents monomer units having polar functional groups and subscript c is zero or non-zero;
$M^{other}$ represents other monomer units and subscript d is zero or non-zero.

15. The polymerizable composition of claim 13 wherein the high $T_g$ macromer is selected from oligomeric styrene, methystyrene, poly(methyl methacrylate) and macromers of high $T_g$ monomers.

16. The polymerizable composition of claim 13 comprising 70-95 wt. % of said (meth)acrylate copolymer having pendent photoinitiator groups and 5-30 wt. % of a macromers of high $T_g$ monomers.

17. The polymerizable composition of claim 13 wherein MN comprises interpolymerized monomers of the formula:

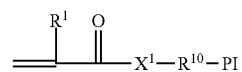

where;
$X^1$ is —O— or —NR$^1$,
$R^1$ is independently H or $C_1$-$C_4$ alkyl;
PI is a photoinitiator group;

$R^{10}$ is a divalent (hetero)hydrocarbyl linking group connecting the (meth)acryloyl group with the PI group.

18. The polymerizable composition of claim 17 wherein the photoinitiator groups of the photoinitiator monomer $M^{PI}$ is an alpha-cleavage type photoinitiator group.

* * * * *

UNITED STATES PATENT AND TRADEMARK OFFICE
CERTIFICATE OF CORRECTION

PATENT NO. : 9,714,369 B2  Page 1 of 1
APPLICATION NO. : 15/117485
DATED : July 25, 2017
INVENTOR(S) : Hae-Seung Lee It is certified that error appears in the above-identified patent and that said Letters Patent is hereby corrected as shown below:

In the Specification

Column 7,
Line 67, after "thereof" insert -- ; --.

Column 10,
Line 30, after "crosslinking" insert -- . --.

Column 15,
Line 38, after "or" insert -- —$NR^1$, --.

Column 16,
Line 47, after "or" insert -- —$NR^1$, --.

In the Claims

Column 18,
Line 11, Claim 10, delete "a" and insert -- an --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*